United States Patent [19]

Ishibe

[11] Patent Number: 5,361,107
[45] Date of Patent: Nov. 1, 1994

[54] PROJECTION OPTICAL APPARATUS
[75] Inventor: Yoshihiro Ishibe, Kawasaki, Japan
[73] Assignee: Canon Kabushiki Kaisha, Tokyo, Japan
[21] Appl. No.: 959,429
[22] Filed: Oct. 13, 1992
[30] Foreign Application Priority Data Oct. 16, 1991 [JP] Japan .................. 3-298446

[51] Int. Cl.⁵ .................................................. G03B 21/00
[52] U.S. Cl. ............................................ 353/101; 353/122
[58] Field of Search ............... 353/102, 101, 100, 97, 353/122; 355/71, 67, 52, 77, 55, 56

[56] References Cited
U.S. PATENT DOCUMENTS

| | | | |
|---|---|---|---|
| 4,619,508 | 10/1986 | Shibuya et al. | 353/85 |
| 4,931,830 | 6/1990 | Suwa et al. | 355/71 |
| 4,938,572 | 7/1990 | Iwasaki | 350/423 |
| 4,939,630 | 7/1990 | Kikuchi et al. | 355/67 |
| 4,974,919 | 12/1990 | Muraki et al. | 353/122 |
| 5,038,168 | 8/1991 | Kurimoto et al. | 355/56 |
| 5,078,487 | 1/1992 | Toyono et al. | 353/76 |

FOREIGN PATENT DOCUMENTS 1025115 1/1989 Japan .
2086608 5/1982 United Kingdom .

Primary Examiner—William A. Cuchlinski, Jr.
Assistant Examiner—William C. Dowling
Attorney, Agent, or Firm—Fitzpatrick, Cella, Harper & Scinto

[57] ABSTRACT

A projection optical apparatus comprises an illuminating device for illuminating an image, and a projecting device for projecting the image illuminated by the illuminating device onto a predetermined plane. In the projection optical apparatus, the projecting device has an NA on a side of the predetermined plane changed depending upon a projection magnification of the image onto the predetermined plane.

12 Claims, 7 Drawing Sheets

PROJECTION OPTICAL APPARATUS

BACKGROUND OF THE INVENTION

1. Field of the Invention

The present invention relates to a projection optical apparatus. More particularly, the invention relates to a projection optical apparatus suitably applicable as such an apparatus as a film projector and a microfilm reader printer, which may prevent light amount unevenness on a surface of a screen, due to a luminous intensity distribution (luminous intensity property) of a light source, by properly setting an NA (numerical aperture) of a projection lens on a screen side depending upon a projection magnification when an image to be projected, for example an image on a slide, is enlarged for projection onto the screen surface.

2. Related Background Art.

In conventional projection optical apparatuses such as a film projector and a microfilm reader printer, an optical flux from light source means is converged by using a condenser lens and a field lens to illuminate an image to be projected (projection image) of a slide or of a liquid crystal display device (transmission type). Then the projection image is enlarged and projected by a projection lens at a predetermined projection magnification onto a surface of a screen.

FIG. 1 is a main part schematic drawing of an optical system in a conventional projection optical apparatus.

In FIG. 1, an optical flux radiated from light source means 51 comprising a halogen lamp passes through a condenser lens 52, a heat absorbing filter 53, and a field lens 54 to illuminate an effective illumination area of a projection image 55 of transmission type on a slide or the like located at a plane 55a to be illuminated. A projection lens 56 enlarges to project the projection image 55 thus illuminated onto a surface of a screen 60 at a predetermined magnification.

In the projection optical apparatus as shown in FIG. 1, the optical flux from the light source means 51 is converged (imaged) at or near an entrance pupil 58 of the projection lens 56. That is, the optical elements are arranged to image a lighting plane (filament) 57 of the light source means 51 at or near the entrance pupil 58.

Further, an NA (numerical aperture) on the side of the screen 60 is arranged as unchanged with a change in projection magnification to maintain brightness of total projection image on the surface of the screen 60 unchanged in various changes of projection magnification.

There is such a problem recognized in the projection optical apparatus as described that unevenness in light amount is caused by a luminous intensity distribution of the light source means 51 at a low projection magnification on the surface of the screen 60 if a ratio of projection magnifications, or magnification change ratio exceeds a certain level.

The reason why the light amount unevenness occurs is as follows.

A halogen lamp is generally used as the light source means in conventional projection optical apparatuses. The halogen lamp tends to have unevenness in luminous intensity property due to a structure of its lighting plane (filament).

FIGS. 2A and 2B are explanatory drawings to show a perspective view and a luminous intensity property of a general halogen lamp. The x-, the y-, and the z-axes are defined as shown in FIG. 2A.

Since there is unevenness in luminous intensity property in the xy section of the halogen lamp as shown in FIG. 2B, there are directions of bright optical flux and directions of dark optical flux depending upon a radiation direction as shown in FIG. 3 when the halogen lamp is seen from above.

FIG. 4 is a main part schematic drawing of an optical system in a conventional projection optical apparatus to show occurrence of light amount unevenness on a screen surface when the halogen lamp having such a luminous intensity property is used as the light source means.

As shown in FIG. 4, among optical fluxes radiated from the light source means 51, an optical flux passing through an illumination optical system 50 and then near a central portion 55A of a projection image 55 is bright in luminous intensity property of the light source means 51. When the projection image 55A illuminated by this optical flux is enlarged and projected onto a surface of the screen 60 by the projection lens 56, a central portion of the surface of the screen 60 becomes bright in a projected image.

In contrast, among the optical fluxes radiated from the light source means 51, an optical flux passing through the illumination optical system 50 and then through a peripheral portion 55B of the projection image 55 is dark in luminous intensity property of the light source means 51. When the projection image 55B illuminated by this optical flux is enlarged and projected onto the surface of the screen 60 by the projection lens 56, a peripheral portion of the screen surface becomes dark in the projected image.

For the above reason, the light amount unevenness occurs from the luminous intensity distribution of the light source means 51, for example by which the central portion is bright and the peripheral portion is dark on the surface of the screen 60.

The above-described light amount unevenness on the surface of the screen 60, however, may be made ambiguous by properly selecting an imaging magnification, at which a lighting plane (filament) 57 is imaged by the condenser lens 52 and the field lens 54 at near the entrance pupil 58 of the projection lens 56, and an $F_{NO}$ (f-number) of the projection lens 56.

Namely, it may be accomplished by setting larger an angular aperture or NA (numerical aperture) of optical fluxes radiated from the light source means 51 and then incident into tile condenser lens 52.

FIGS. 5A and 5B are explanatory drawings of the light source means 51 and neighbors when the light amount unevenness is corrected by increasing the NA of the incident optical fluxes from the light source means 51 into the condenser lens 52.

As seen in FIGS. 5A and 5B, either optical fluxes advancing in A direction (for example toward tile central portion of the screen surface) or optical fluxes advancing in B direction (for example toward the peripheral portion of the screen surface) include optical fluxes both of bright portion and of dark portion in the luminous intensity distribution of the light source means 51, consequently averaging the luminous intensity distribution.

According to the above arrangement, a difference in brightness may be nullified between the optical fluxes advancing in A direction and in B direction, so that the occurrence of light amount unevenness caused by the luminous intensity distribution of the light source means may be minimized.

An increase in NA of the incident optical fluxes from the light source means 51 into the condenser lens 52 may be accomplished by decreasing the $F_{NO}$ of the projection lens 56, or by increasing the imaging magnification at which the lighting plane (filament) 57 is imaged at or near the entrance pupil 58 of the projection lens 56.

In a general projection optical apparatus, such as a film projector and a microfilm reader printer, which has a fixed projection magnification of the projection lens, or, in one which has a variable projection magnification in a magnification change ratio, which is a ratio of projection magnifications, of 3 or less, the occurrence of the light amount unevenness may be effectively prevented on the screen surface in the state as shown in FIGS. 5A, 5B for the incident optical fluxes from the light source means into the condenser lens, that is, by making the NA thereof large.

However, once the magnification change ratio of the projection optical apparatus exceeds three, it becomes difficult to always maintain large the NA of the incident optical fluxes from the light source means into the condenser lens, even by using a projection lens with any projection magnification. It is generally preferable that the illuminance is always constant on the screen surface with a change in projection magnification of the projection lens in a projection optical apparatus such as a film projector and a microfilm reader printer. Therefore, an NA on the screen side is conventionally set to always become constant irrespective of the change in projection magnification of the projection lens.

However, if the NA of the projection lens on the screen side is made constant, the NA of the projection lens on the projection image side changes with a change in projection magnification. For example, letting a projection magnification of the projection lens be M, an NA on the screen side be $NA_S$, and an NA on the projection image side be $NA_O$, there is a relation among them as follows:

$$NA_O = M \times NA_S.$$

If the NA of the projection lens on the screen side (as will be referred to as $NA_S$) is fixed, the NA of the projection lens on the projection image side (as will be referred to as $NA_O$) is proportional to the projection magnification M. That is, $NA_O$ is proportional to the projection magnification M of the projection lens.

Further, since the NA of the incident optical fluxes from the light source means into the condenser lens (as will be referred to as $NA_L$) is proportional to $NA_O$, the $NA_L$ changes in proportion to the projection magnification M of the projection lens after all.

The $NA_L$ will be compared in an example in which two projection lenses different in projection magnification M are used, one with a low magnification of 10 times and the other with a high magnification of 50 times, presenting a magnification change ratio of 5.

For example, suppose that a value of the $NA_L$ is 0.5 with a projection magnification of 50 times. Then a value of the $NA_L$ becomes 0.1 with a projection magnification of 10 times. If the $NA_L$ value should be set over 0.8 (angular aperture of about 110 degrees), a condensing efficiency could not be improved in actual in view of the property of the luminous intensity distribution of halogen lamp as shown in FIG. 2B. Also, it becomes difficult to maintain performance of imaging of the illumination optical system. It is, therefore, generally preferable that the $NA_L$ value is set to be about 0.8 at most.

For example, if the $NA_L$ value is set to be 0.8 with the projection magnification of the projection lens being 50 times, the $NA_L$ value is only 0.16 with the projection magnification of the projection lens being 10 times. The $NA_L$ value of 0.16 corresponds to an angular aperture of 9.2 degrees.

Thus, a state of projection for the latter is the same as the projection state as shown in FIG. 4. The light amount unevenness is eventually caused by the luminous intensity distribution of the light source means at a low magnification on the screen surface.

As explained, in case that the magnification change ratio becomes greater to some extent in the conventional projection optical apparatuses, there is a problem of occurrence of light amount unevenness caused by the luminous intensity distribution of the light source means at a low magnification on the screen surface.

Although it is supposed in the above explanation that the magnification change ratio of the projection optical apparatus is 5, the light amount unevenness is likely to occur with a magnification change ratio of about 3.

SUMMARY OF THE INVENTION

It is an object of the present invention to provide a projection optical apparatus which, by using a projection lens having an NA (numerical aperture) on a screen side changed depending upon a projection magnification, may well correct light amount unevenness otherwise possibly caused by a luminous intensity distribution of a light source and being outstanding at near a low projection magnification with a magnification change ratio being large (more than three times), whereby a projection image may be constantly obtained with even brightness on a screen surface.

In a projection optical apparatus according to the present invention, optical fluxes radiated from light source means pass through an illumination optical system to illuminate a projection image, the projection image is projected by a projection lens onto a screen surface, and the projection lens has an NA on the screen side changed depending upon a projection magnification of the projection image onto the screen surface.

Specifically, the present invention is characterized in that, in selection of a lens as the projection lens out of plural fixed focus lenses, the projection lens is selected such that the NA on the screen side at a low projection magnification is greater than the NA on the screen side at a high projection magnification.

Also, the present invention is characterized in that, in an arrangement using a zoom lens as the projection lens to continuously change the projection magnification in projection, an aperture stop diameter provided in the projection lens is adjusted such that the NA of the projection lens on the screen side at a low projection magnification becomes greater than the NA of the projection lens on the screen side at a high projection magnification.

Further, the present invention is characterized in that light amount correction means is provided in an optical path between the light source means and the screen to maintain the illuminance substantially constant on the screen surface irrespective of the projection magnification of the projection lens.

DETAILED DESCRIPTION OF THE PREFERRED EMBODIMENTS

Figure 6A:
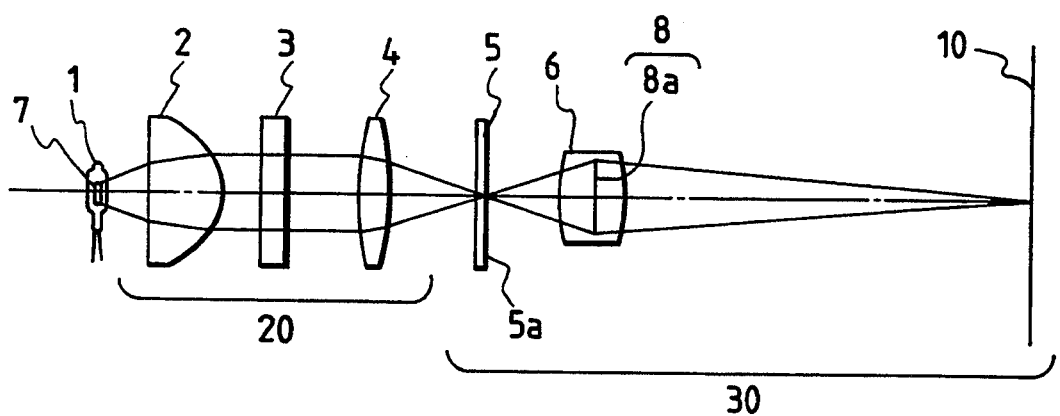
FIGS. 6A and 6B are main part schematic drawings of an optical system of a projection optical apparatus in the first embodiment according to the present invention.
Figure 6B:
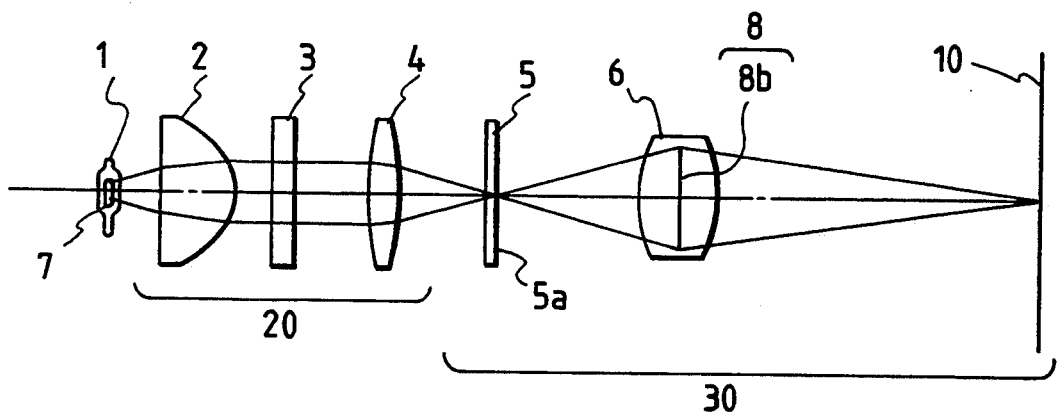

FIGS. 6A and 6B are main part schematic drawings of an optical system of a projection optical apparatus in the first embodiment according to the present invention.

FIG. 6A shows a state of projection using a projection lens 6 with a high projection magnification, and FIG. 6B shows a state of projection using a projection lens 6 with a low projection magnification. In the embodiment of FIGS. 6A and 6B, a magnification change ratio, which is a ratio of projection magnifications of the projection lenses 6, is set to be about 3 or more.

Figure 1:
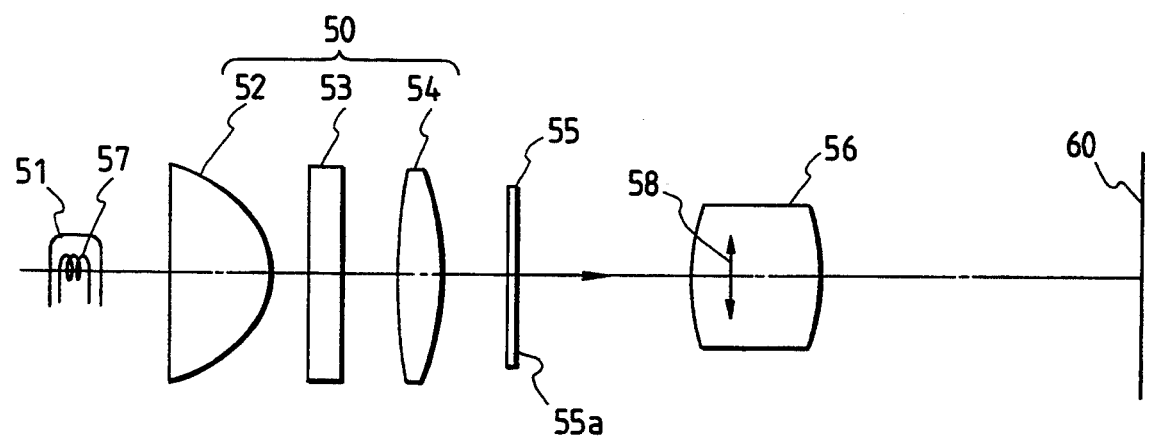
FIG. 1 is a main part schematic drawing of an optical system in a conventional projection optical apparatus.
Figure 2A:
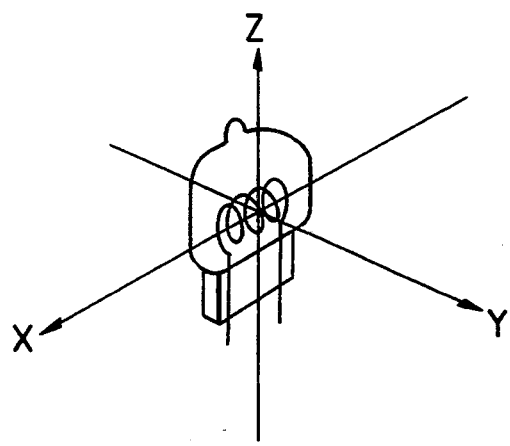
FIGS. 2A and 2B are a perspective view and an explanatory drawing of luminous intensity property of a general halogen lamp, respectively.
Figure 2B:
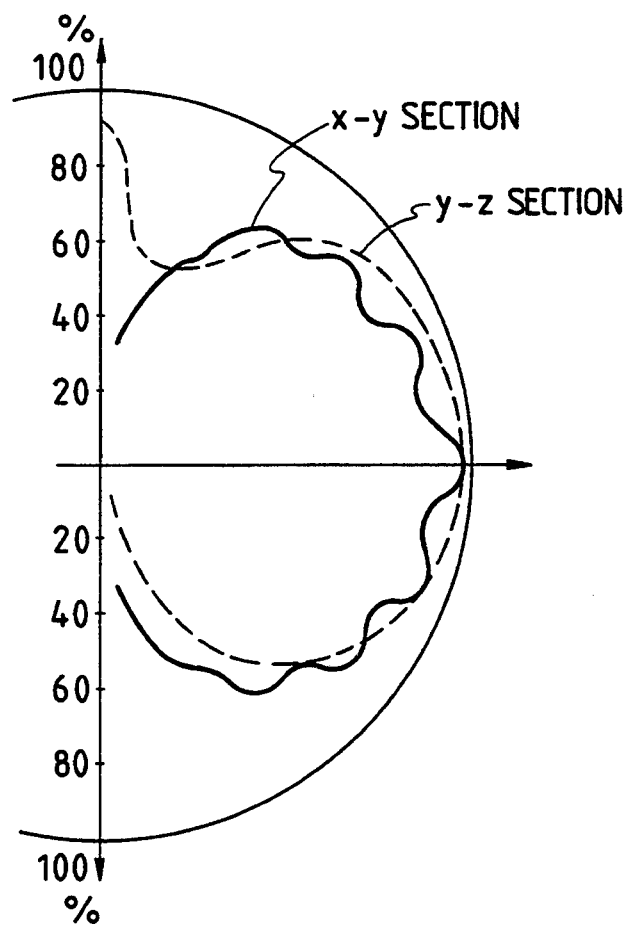
Figure 3:
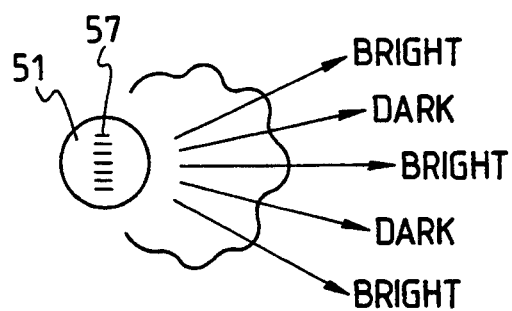
FIG. 3 is an explanatory drawing to show occurrence of bright and dark directions due to the luminous intensity property of a halogen lamp.
Figure 4:
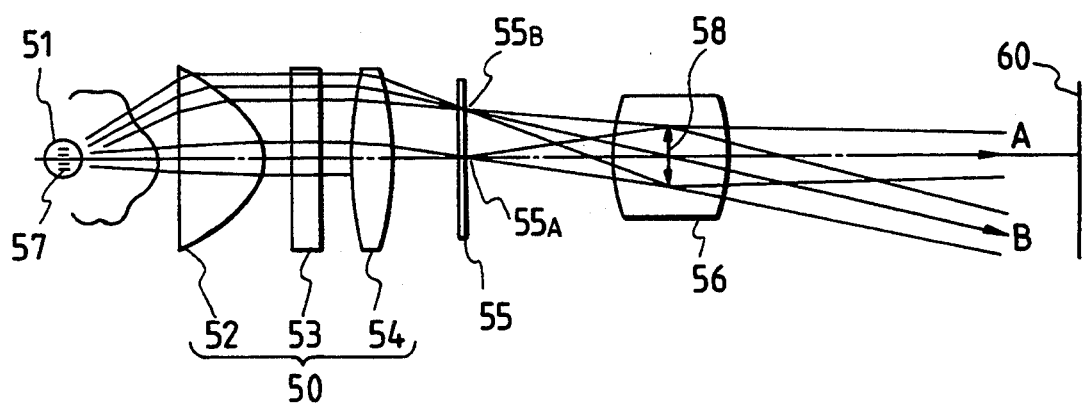
FIG. 4 is a main part schematic drawing of an optical system in a conventional projection optical apparatus to show occurrence of light amount unevenness on a screen surface.
Figure 5A:
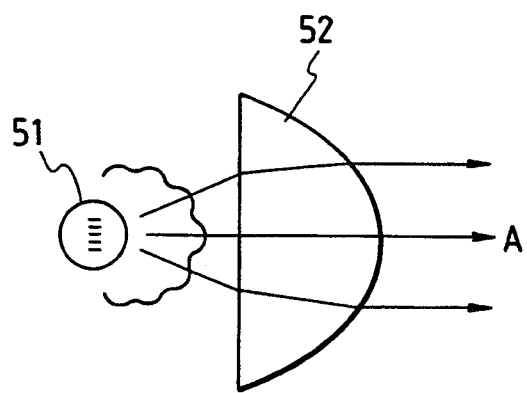
FIGS. 5A and 5B are explanatory drawings to show a method to improve the light amount unevenness.
Figure 5B:
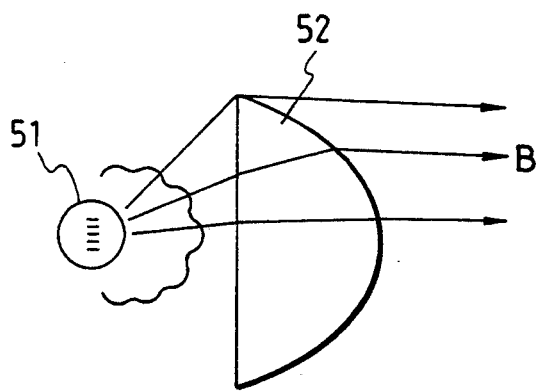

In FIGS. 6A, 6B, numeral 1 denotes light source means, which comprises a halogen lamp having a luminous intensity property as shown in FIGS. 2A and 2B. Numeral 7 denotes a filament as a lighting plane. Numeral 2 represents a condenser lens, which converges optical fluxes radiated from the light source means 1. Numeral 3 is a heat absorbing filter, which allows visible light to pass but absorbs infrared light. Numeral 4 designates a field lens.

In the present embodiment, the elements of the condenser lens 2, the heat absorbing filter 3, and the field lens 4 constitute an illumination optical system 20.

Further, the illumination optical system 20 makes the lighting plane (filament) 7 of the light source means 1 imaged at or near an entrance pupil 8 of a projection lens 6 as below described.

Numeral 5a denotes a plane to be illuminated, on which an image to be projected (projection image) 5 of a slide or of a liquid crystal display device of a transmission type is located. The projection image 5 is illuminated by the optical fluxes from the illumination optical system 20. Numeral 6 comprises an exchangeable projection lens as described later, and enlarges to project the projection image 5 located on the plane 5a to be illuminated, at a predetermined magnification on a surface of a screen 10. The projection image 5, the projection lens 6, and the screen 10 constitute a projection system 30.

In the present embodiment as arranged, the optical fluxes radiated from the light source means 1 are converged by the condenser lens 2, pass through the heat absorbing filter 3 and the field lens 4, and illuminate the projection image 5 located on the plane 5a to be illuminated. Then the projection image 5 is enlarged and projected by the projection lens 6 at a predetermined projection magnification onto the surface of the screen 10.

As the projection lens 6 in the present embodiment, a plurality of single focus lenses (projection lenses) different in projection magnification from each other are prepared, and a projection lens matching a specific application is selected for use among the plural projection lenses 6, thereby projecting the image at a predetermined projection magnification.

Upon the selection of one lens as the projection lens out of the plural fixed focus lenses, the projection lens is selected for use such that the NA on the screen side at a low projection magnification is greater than that on the screen side at a high projection magnification.

FIG. 6A shows use of the projection lens 6 with a high magnification, and FIG. 6B with a low magnification.

The projection lenses 6 have respective NA's on the side of the screen 10 ($NA_S$) different from each other depending upon the projection magnification thereof. In detail, the NA on the screen side is set greater for the plural projection lenses in the present embodiment as the magnification increases from the low magnification to the high magnification.

By this, the NA ($NA_L$) of the incident optical fluxes from the light source means 1 into the condenser lens 2 at a high magnification may be made scarcely different from that at a low magnification. Consequently, the $NA_L$ at a low magnification may be maintained large, whereby the light amount unevenness, which could be caused by the luminous intensity distribution of the light source means 1, may be effectively prevented on the screen 10.

In the present embodiment, the projection lens may be, instead of the exchangeable projection lenses, a zoom lens variable in magnification or one arranged to select from a plurality of zoom lenses.

For example, if the light amount unevenness is desired to correct at a low magnification in the arrangement with one zoom lens as the projection lens, a shape of a cam for a variable aperture incorporated into the projection lens would be arbitrarily changed depending upon the projection magnification. In detail, the $NA_S$ at a low magnification may be made larger than that at a high magnification. Alternatively, a diaphragm blade may be so shaped that the $NA_S$ at a low magnification is larger than that at a high magnification.

If the projection lens is constituted by a plurality of zoom lenses, an $NA_S$ for a zoom lens with the lowest magnification, or $NA_S$'s for some zoom lenses with respective low magnifications may be set larger than that or those of zoom lens(es) with a high magnification(s).

As described, the $NA_S$ on the screen side is properly changed depending upon the projection magnification of the projection lens in the present embodiment. In detail, the NA of the projection lens on the screen side at a low projection magnification is set larger than that of the projection lens on the screen side at a high projection magnification. By this, the light amount unevenness may be effectively prevented on the screen surface, which might be caused by the luminous intensity distribution of the light source means at a low magnification and which has been a problem in the conventional apparatuses in case that the magnification change ratio of the projection optical apparatus exceeds a certain level (about 3 or more).

Figure 7:
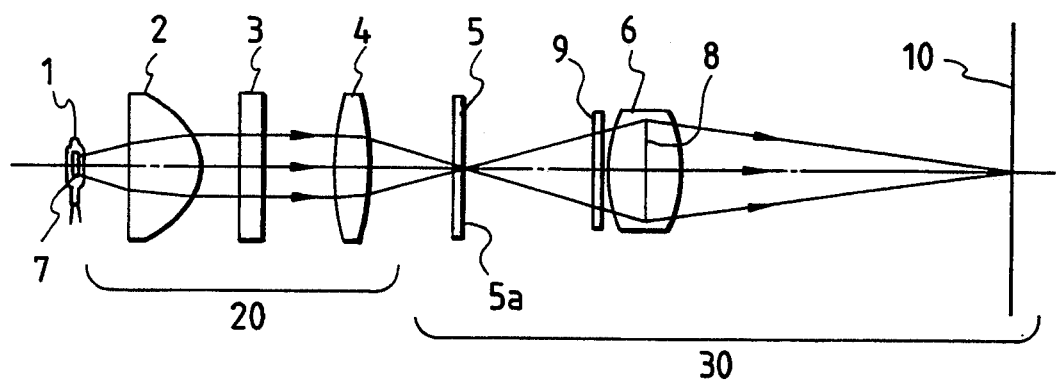
FIG. 7 is a main part schematic drawing of an optical system of a projection optical apparatus in the second embodiment according to the present invention.

FIG. 7 is a main part schematic drawing of an optical system of a projection optical apparatus in the second embodiment according to the present invention. In FIG. 7, the same numerals are given to the same elements as those in FIGS. 6A and 6B.

In FIG. 7, numeral 9 denotes light amount correction means, which comprises an NA filter to control an intensity of transmission light. The light amount correction means 9 is disposed in an optical path between a projection image 5 and a projection lens 6 in a demountably inserted manner. The light amount correction means 9 is inserted into the optical path when the projection lens 6 with a low magnification is used in the present embodiment.

It is generally preferable that the illuminance (illuminance distribution) is set unchangeable on a screen surface with a change in projection magnification of the projection lens in a projection optical apparatus such as a film projector and a microfilm reader printer.

In the present embodiment, an NA ($NA_S$) on a side of the screen 10 for a projection lens 6 with a low projection magnification is set larger than that for a projection lens 6 with a high projection magnification. Then, the illuminance on the surface of the screen 10 increases in accordance with a value of the $NA_S$ at the low magnification, as compared to that at the high magnification, so that a brighter projection image is obtained as a whole at the low magnification than at the high magnification.

Such brightness change could be acceptable for an apparatus only for a purpose to observe a projected image, but cannot be accepted by an apparatus such as a microfilm reader printer purposed to print out an image as well. It is not preferred that an increased illuminance is obtained only at a low magnification on the screen surface.

It is in general desirable in a projection optical apparatus that a constant illuminance may be always obtained on the screen surface even with use of a projection lens with any projection magnification.

Thus, in the present embodiment, the ND filter 9 is inserted into the optical path between the projection image 5 and the projection lens 6 when the projection lens 6 with low magnification is used, so that the illuminance increase may be restricted on the surface of the screen 10, which might be caused by the increase in $NA_S$ at the low magnification. By this arrangement, the illuminance on the screen surface at the low magnification is made substantially equal to that at the high magnification, balancing with each other to obtain an excellent projection image.

It is sufficient for the ND filter 9 to be inserted into the optical path only when the projection lens 6 with the low magnification is used. Therefore, it can be so arranged that an operator of the apparatus manually inserts the ND filter 9. Alternatively, the ND filter 9 may be so arranged that electrical means detects the use of the projection lens with the low magnification and that the ND filter 9 is automatically inserted.

Another alternative method is to originally incorporate the ND filter 9 into the projection lens of large $NA_S$ with the low magnification. This method is effective to simplify the total apparatus, because there is no need to provide an extra mechanism for insertion and withdrawal of the ND filter 9.

Although the ND filter 9 is provided in the optical path between the projection image 5 and the projection lens 6 in the demountably inserted manner in the present embodiment, the filter 9 may be disposed in the optical path between the projection lens 6 and the surface of the screen 10 in the demountably inserted manner.

As described, the light amount correction means (ND filter) is disposed in the optical path between the light source means and the screen so as to maintain the illuminance substantially constant on the screen surface irrespective of the projection magnification of the projection lens.

Figure 8:
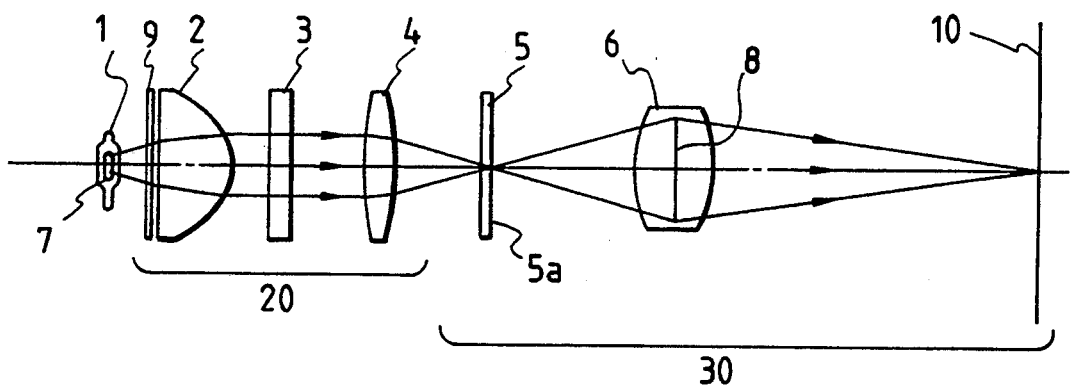
FIG. 8 is a main part schematic drawing of an optical system of a projection optical apparatus in the third embodiment according to the present invention.

FIG. 8 is a main part schematic drawing of an optical system of a projection optical system in the third embodiment according to the present invention. In FIG. 8, the same numerals are given to the same elements as those in FIG. 7.

The present embodiment is different from the second embodiment in that the insertion and withdrawal position of the ND filter as the light amount correction means is set in an illumination optical system 20 instead of in the projection system 30. Others in structure are the same as those in the second embodiment.

In detail, the ND filter 9 is arranged to be put into and taken out of an optical path between the light source means 1 and the condenser lens 2 in the present embodiment. The ND filter 9 is inserted into the optical path when the objection lens with the low magnification is used. By this arrangement, the third embodiment achieves the same effect as the second embodiment.

Also in the present embodiment, the ND filter 9 may be so arranged as to be manually put into or taken out of the optical path by an operator of the apparatus, or as to be automatically put into or taken out of the optical path by detecting the use of the projection lens 6 with the low magnification by electrical means, similarly as in the second embodiment.

Although the ND filter 9 is disposed in the optical path between the light source means 1 and the condenser lens 2 in the demountably inserted manner in the present embodiment, the position for insertion and withdrawal is not limited to that as described. For example, the ND filter 9 may be disposed between the condenser lens 2 and the heat absorbing filter 3, between the heat absorbing filter 3 and the field lens 4, or between the field lens 4 and the projection image 5.

In case that the ND filter 9 is inserted into the illumination optical system 20 as in the present embodiment, the ND filter 9 may be replaced for example by a diffusion plate having a diffusion effect, applying the present invention in the same manner as in the above embodiment. The diffusion effect of the diffusion plate restricts the illuminance on the surface of the screen 10 in the same manner as the ND filter 9, and the luminous intensity distribution of the light source means 1 may be diffused, more effectively making the brightness of the projection image even on the surface of the screen 10.

The ND filter is used as the light amount correction means in the second and the third embodiments, but it should be noted that any optical member may be used to apply the present invention if it can adjust the optical fluxes (light amount) from the light source means as explained above.

Figure 9:
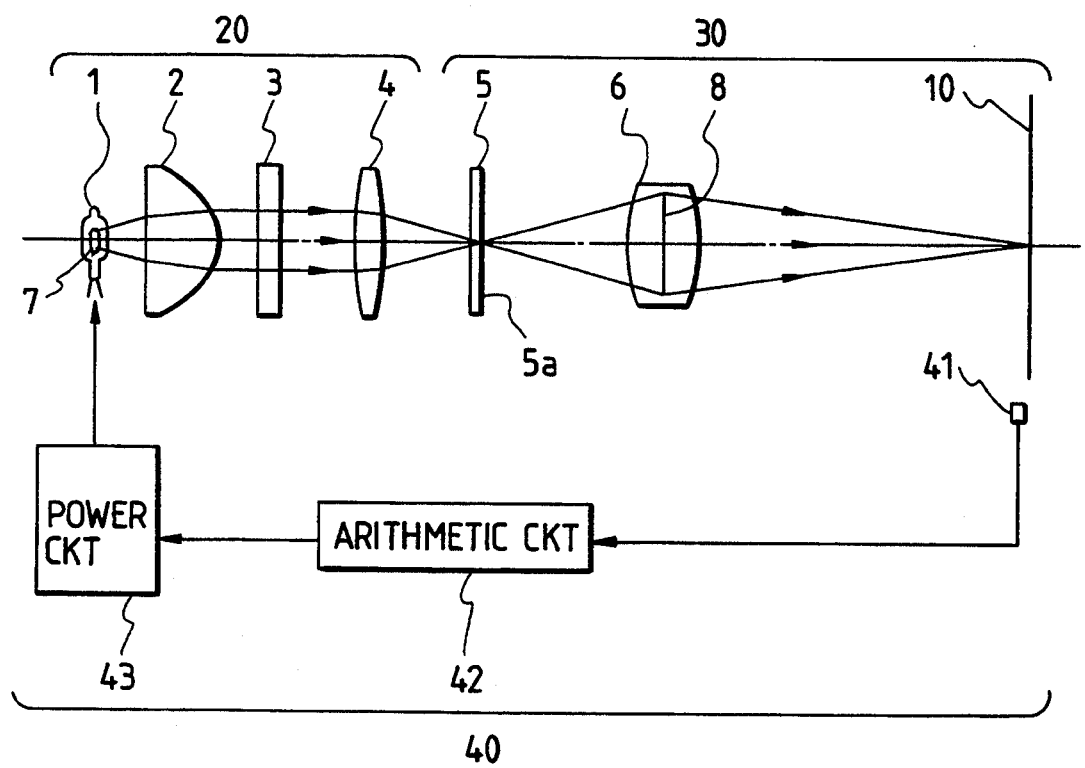
FIG. 9 is a main part schematic drawing of a projection optical apparatus in the fourth embodiment according to the present invention.

FIG. 9 is a main part schematic drawing of an optical system of a projection optical apparatus in the fourth embodiment according to the present invention. In FIG. 9, the same numerals are given to the same elements as those in FIGS. 6A and 6B.

In FIG. 9, numeral 40 denotes light amount correction means, which comprises a light receiving element 41, an arithmetic circuit 42, and a power circuit 43.

In the present embodiment, the projection lens 6 is constituted by a single zoom lens. In order that the NA ($NA_S$) on the screen side at a low magnification is made larger than that at a high magnification, a cam shape of variable aperture or a shape of a diaphragm blade incorporated into the zoom lens is properly changed. Thus, the light amount unevenness may be corrected on the screen surface at the low magnification.

In the second and the third embodiments as described above, the demountable ND filter is provided in the optical path as the light amount correction means in order to restrict the illuminance on the surface of the screen 10 at the low magnification with the $NA_S$ being enlarged. It is, however, difficult in the present embodiment to deal with the problem of illuminance only with the ND filter inserted into and withdrawn from the optical path, because the zoom lens is used as the projection lens 6.

It is because the $NA_S$ cannot be suddenly increased at a certain projection magnification in case that the NA ($NA_S$) on the screen side is to be enlarged at a low magnification in the above method, but it should be gradually (continuously) increased. If the ND filter is inserted in this state, it is difficult to maintain the illuminance on the screen surface completely constant within a range of magnification in which the $NA_S$ is gradually changing.

Then, in the present embodiment, there is the light receiving element 41 located near the surface of the screen 10 to detect a state of the illuminance on the surface of the screen 10, the illuminance on the screen surface is calculated by the arithmetic circuit 42 using an output from the light receiving element 41, the calculation result is fed back to the power circuit 43 controlling the light source means 1, and the power voltage of the light source means 1 is adjusted in accordance with the illuminance on the surface of the screen 10. This arrangement allows the illuminance on the surface of the screen 10 to be always kept constant irrespective of the magnification change.

As described, the fourth embodiment is so arranged that the zoom lens is used as the projection lens and that, in projection continuously changing the projection magnification, a diameter of the aperture stop disposed on the projection lens is adjusted such that the NA of the projection lens on the screen side at the low projection magnification becomes greater than that at the high projection magnification.

As described above, according to the present invention, using the projection lens differing in NA (numerical aperture) on the screen side depending upon the projection magnification, there is attained a projection optical apparatus which may correct the light amount unevenness on the screen surface, otherwise possibly caused by the luminous intensity distribution of the light source means at a low magnification when a projection optical apparatus has a large magnification change ratio (for example of about 3 or more) and conventionally having been a problem, and which may always obtain an excellent projection image without the light amount unevenness.

Also, according to the present invention, there is attained a projection optical apparatus which may always maintain the illuminance constant on the screen surface when the NA of the projection lens on the screen side is set larger, by inserting the ND filter or the diffusion plate as the light amount correction means into the optical path, or, by providing the apparatus with the light amount correction means to adjust the power voltage of the light source means.

What is claimed is:

1. A projection optical apparatus comprising:
   illuminating means for illuminating an image; and
   projecting means for projecting the image illuminated by said illuminating means onto a predetermined plane,
   wherein said projecting means has an NA on a side of said predetermined plane changed depending upon a projection magnification of the image onto said predetermined plane, wherein
   the NA on the side of said predetermined plane at a low projection magnification is made greater than the NA on the side of said predetermined plane at a high projection magnification by said projection means.

2. A projection optical apparatus according to claim 1, further comprising light amount correction means disposed in an optical path between a light source portion of said illuminating means and said predetermined plane.

3. A projection optical apparatus according to claim 1, wherein said illuminating means includes a halogen lamp.

4. A projection optical apparatus according to claim 1, wherein said projecting means corrects a light amount unevenness due to a luminous intensity distribution of said illuminating means.

5. A projection optical apparatus according to claim 2, wherein said light amount correction means is arranged in the optical path when a low projection magnification of the image on said predetermined plane is made.

6. A projection optical apparatus according to claim 1, wherein the NA of said projecting means is changed at an exit side of said predetermined plane.

7. An image projection method comprising the steps of:
   illuminating an image by illuminating means;
   projecting by projecting means the image illuminated by the illuminating means onto a predetermined plane; and
   changing an NA of the projecting means on a side of the predetermined plane depending upon a projection magnification of the image onto the predetermined plane, wherein
   the NA on the side of said predetermined plane at a low projection magnification is made greater than the NA on the side of said predetermined plane at a high projection magnification by the projecting means.

8. An image projection method according to claim 7, wherein said illuminating means includes a halogen lamp.

9. An image projection method according to claim 7, wherein said projecting means corrects a light amount unevenness due to a luminous intensity distribution of said illuminating means.

10. A image projection method according to claim 7, further comprising the step of arranging a light amount correction means in an optical path between a light source unit of said illuminating means and said predetermined plane.

11. An image projection method according to claim 10, wherein said light amount correction means is arranged in the optical path when a low projection magnification of the image on said predetermined plane is made.

12. An image projection method according to claim 7, wherein the NA is changed on an exit side of the predetermined plane.

* * * * *

UNITED STATES PATENT AND TRADEMARK OFFICE
CERTIFICATE OF CORRECTION

PATENT NO. : 5,361,107
DATED : November 1, 1994
INVENTOR(S) : Ishibe

It is certified that error appears in the above-indentified patent and that said Letters Patent is hereby corrected as shown below:

Title page,
[56] REFERENCES CITED:

FOREIGN PATENT DOCUMENTS, "1025115  1/1989  Japan." should read --1-25115  1/1989  Japan.--.

COLUMN 2:

Line 55, "tile" should read --the--.

Signed and Sealed this

Thirtieth Day of May, 1995

Attest:

BRUCE LEHMAN

Attesting Officer

Commissioner of Patents and Trademarks